United States Patent [19]
Minemoto et al.

[11] Patent Number: 5,381,429
[45] Date of Patent: Jan. 10, 1995

[54] LASER DEVICE WITH WAVELENGTH CONVERTER USING ORGANIC IONIC CRYSTAL

[75] Inventors: Hisashi Minemoto, Otsu; Yusuke Ozaki, Toyonaka; Nobuo Sonoda, Settu, all of Japan

[73] Assignee: Matsushita Electric Industrial Co., Ltd., Osaka, Japan

[21] Appl. No.: 62,341

[22] Filed: May 14, 1993

[30] Foreign Application Priority Data

| | | |
|---|---|---|
| Mar. 22, 1992 [JP] | Japan | 5-061680 |
| May 18, 1992 [JP] | Japan | 4-124577 |
| May 26, 1992 [JP] | Japan | 4-133300 |
| Sep. 4, 1992 [JP] | Japan | 4-236997 |
| Sep. 14, 1992 [JP] | Japan | 4-244391 |

[51] Int. Cl.$^6$ ............... G02F 1/35; H01S 3/10
[52] U.S. Cl. ............................... 372/21; 359/325
[58] Field of Search ............ 385/2, 122; 372/21, 372/22; 359/325, 326, 327, 328

[56] References Cited

U.S. PATENT DOCUMENTS

| | | | |
|---|---|---|---|
| 3,679,907 | 7/1972 | Bonner et al. | 359/328 |
| 3,965,375 | 6/1976 | Bergman, Jr. et al. | 359/328 |
| 4,622,409 | 11/1986 | Nicoud et al. | 359/328 |
| 5,031,999 | 7/1991 | Harada et al. | 359/326 |
| 5,123,022 | 6/1992 | Ebbers et al. | 359/326 X |
| 5,274,651 | 12/1993 | Urakami | 372/22 X |

FOREIGN PATENT DOCUMENTS 0389879 10/1990 European Pat. Off. .
2185481 7/1987 United Kingdom .

OTHER PUBLICATIONS

"New Nonlinear Organic materials for generation of the second harmonic of neodymium laser radiation" By Davydov et al. Sov. J. Quantum Electron., vol. 7 No. 1 (Jan. 1977).
Japanese Patent Abstract No. JP63021627 dated Jan. 29, 1988.
Japanese Patent Abstract No. JP2282231 dated Nov. 19, 1990.
Database WPI, Week 9205, No. 92-037751 and JP-A-3284734 (Dec. 16, 1991).
Database WPI, Week 9313, No. 93-105037 and JP-A-5045684 (Feb. 26, 1993).

*Primary Examiner*—Akm E. Ullah
*Attorney, Agent, or Firm*—Fish & Richardson

[57] ABSTRACT

A laser apparatus includes a semiconductor laser, an optical resonater and a wavelength converter made of a nonlinear optical material. The nonlinear optical material has at least one of aromatic ring and metal ion, and wherein at least one element selected from the group consisting of ion bonding hydrogen, hydrogen bonding hydrogen and hydrogen of water of crystallization is replaced with deuterium. The nonlinear optical material is formed by removing water of crystallization from an organic ionic crystal containing at least one of aromatic ring and metal ion, and recrystallizing with a solvent comprising at least one of ionic bonding deuterium, hydrogen bonding deuterium, and heavy water.

16 Claims, 5 Drawing Sheets

LASER DEVICE WITH WAVELENGTH CONVERTER USING ORGANIC IONIC CRYSTAL

FIELD OF THE INVENTION

The present invention relates to a laser apparatus comprising a wavelength converter having an organic ionic crystal possessing second order nonlinear optical effect as a nonlinear optical material.

BACKGROUND OF THE INVENTION

Currently, intensive research is being made into organic nonlinear optical material showing a great nonlinear optical characteristic as a second order nonlinear optical material. For example, representative molecular crystalline materials include MNA(2-methyl-4-nitroaniline), m-NA (m-nitroaniline), MAP (methyl-(2,4-dinitrophenyl)-aminopropanate), POM (3-methyl-4-nitropyridine-1-oxide) (for example, M. Kato, al., et eds.: "Organic nonlinear optical materials," CMC, (1985); D. S. Chemula et al.: "Nonlinear optical properties of organic molecules and crystals," vol 1, 2, Academic Press, (1987); etc.), chalcone (Japanese Laid open Patent Hei. 3-112982), and many other compounds.

Known examples of organic ionic crystals include, L-arginine phosphate monohydrate (LAP) of salt of L-arginine and phosphoric acid, salt of 2-amino-5-nitropyridine and phosphoric acid (2A5NPDP) (K. Kotler et al.: J. Opt. Soc. Am. B Vol. 9, (1992), page 534), salt of 2-amino-5-nitropyridine and tartaric acid (ANPT), and so on (Watanabe, et al., abstracts from the 62nd fall meeting of the Japan Society of Chemistry, (1991), 2I08).

Moreover, a laser device containing a wavelength converter using molecular crystal as the organic nonlinear optical material (S. Ducharme et al.: Appl. Phys. Lett. Vol. 57, (1990), 537, Y. Kitaoka et al.: Technical Digest of the Conference on Lasers and Electro-Optics (CLEO), 1991, CFA8, etc.), a laser device containing an optical waveguide-type wavelength converter (A. Harada et al.: extended abstracts of the 39th Spring meeting of the Japan Society of Applied Physics and Related Societies, (1992), 29pZR-2), and others are known.

The laser device utilizing the wavelength converter composed of organic nonlinear optical material has the following problems.

When using molecular crystal as the organic nonlinear optical material, since molecules are bonded with each other by weak Van der Waals bonds and/or hydrogen bonds, it is often difficult to grow large crystals. If a crystal is grown of sufficient size, since the crystal is soft, it is difficult to obtain a optically good polished surface. Thus, the scattering components at the crystal surface increase and the transmittance of fundamental waves is lowered thereby providing an insufficient wavelength converter function.

In the light of such molecular crystal problems, organic ionic crystal, which introduces ionicity of large bond strength in organic molecules, has recently come to be considered. In organic ionic crystal, since stronger ionic bonds than Van der Waals bonds or hydrogen bonds are formed in the crystal, a single crystal of relatively large size and great mechanical strength can be easily obtained. However, in the LAP, for example, since the nonlinear optical constant is small, the conversion efficiency of laser light of low power is small, and is not suited to wavelength conversion of semiconductor laser light. Furthermore, for example, in 2A5NPDP or ANPT, although the nonlinear optical constant is higher than that in LAP, if light absorption of a fundamental wave of near infrared to infrared light in a wavelength band of about 1 $\mu$m is present when used in a wavelength converter, a sufficient wavelength conversion efficiency is not obtained.

When using organic nonlinear optical material of molecular crystal as the wavelength converter of a laser device, a favorable crystal end surfaces are not obtained because the crystal is soft and feeble. As a result, the scattering component at the crystal surface increases, and good transmittance of a fundamental wave cannot be obtained, and a laser device provided with a wavelength converter of high efficiency cannot be obtained. If, for example, favorable crystal surfaces are obtained, a temperature rise occurs partially due to the fundamental wave light concentrated in one part of the crystal, and the refractive indeces to fundamental wave and higher harmonics are altered. The phase matching condition (the condition for propagation of fundamental wave and propagation of higher harmonics at the same phase velocity in the crystal) is thus broken, and therefore the conversion efficiency may not be enhanced if the strength of the fundamental wave is increased. To solve this problem, it has been proposed to adhere sapphire plates of high thermal conductivity to the crystal end surface (Sasaki et al.: Japanese Journal of Optics, Vol. 21, No. 5, 1992, page 284) to remove the heat accumulated in the crystal. However, heat release has its own limit because the heat generated inside the crystal is released through the sapphire plates only after the heat reaches the crystal surfaces by propagation through the molecular crystal, with its poor thermal conductivity. In addition, the sapphire plates are expensive.

Using an organic ionic crystal, since organic molecules are mutually bonded by strong ionic bonds, crystal growth is generally easy, and crystal hardness is expected to be high. In the laser device using a wavelength converter of ordinary organic ionic crystals, light absorption occurs in the near infrared to infrared region of the wavelength 1 $\mu$m band. And a large fundamental wave strength is not obtained in an opical resonator. Therefore a laser device with an efficient wavelength converter cannot be obtained.

SUMMARY OF THE INVENTION

The invention provides a laser device having a highly efficient wavelength converter using organic ionic crystals.

In some aspects, the invention provides a laser device, comprising a semiconductor laser, an optical resonator and a wavelength converter, comprising a nonlinear optical material, the nonlinear optical material having at least one of aromatic ring and metal ion, and wherein at least one element selected from the group consisting of ionic bonding hydrogen, hydrogen bonding hydrogen and hydrogen of water of crystallization is replaced with deuterium.

It is preferable in this invention that the nonlinear optical material is formed by removing water of crystallization from an organic ionic crystal containing at least one of aromatic ring and metal ion, and recrystallizing with a solvent comprising at least one of ionic bonding deuterium, hydrogen bonding deuterium, and heavy water.

It is preferable in this invention that the water of crystallization is removed by heating the organic ionic crystal.

It is preferable in this invention that the water of crystallization of the organic ionic crystal is removed under vacuum.

It is preferable in this invention that the nonlinear optical material comprises sodium p-nitrophenolate dihydrate crystal, with the hydrogen of water of crystallization replaced with deuterium.

It is preferable in this invention that the nonlinear optical material comprises p-nitorophenoxy acetic acid sodium salt monohydrate crystal with the hydrogen of water of crystallization replaced with deuterium.

It is preferable in this invention that the nonlinear optical material comprises 5-sulfosalicylic acid disodium salt trihydrate crystal with the hydrogen of water of crystallization and hydrogen of a hydroxyl group replaced with deuterium.

It is preferable in this invention that the metal ion is selected from the group consisting of an alkaline metal ion, an alkaline earth metal ion, a lead ion, a bismuth ion, and a rare earth metal ion.

It is preferable in this invention that the aromatic ring is selected from the group consisting of a benzene ring, a furan ring, and an oxazol ring.

It is preferable in this invention that the wavelength coverter is cut in a phase-matching direction.

It is preferable in this invention that the wavelength coverter is coated with multi-layers of dielectric film.

It is preferable in this invention that the dielectric film is selected from the group consisting of $SiO_2$, $TiO_2$ and $MgF_2$.

It is preferable in this invention that the wavelength converter is laminated with optical glass plates with antireflective films.

In some aspects, the invention relates to a method of a forming a nonlinear optical material for use in a wavelength converter of a laser device, comprising the steps of removing water of crystallization from an organic ionic crystal containing at least one of aromatic ring and metal ion, and recrystallizing with a solvent comprising at least one of ionic bonding deuterium, hydrogen bonding deuterium, and heavy water.

Incidentally, the ionic bonding hydrogen signifies hydrogen that can form ionic bonds; that is, hydrogen that can be dissociated, as contained in various organic and inorganic acids and inorganic bases. The hydrogen bonding hydrogen refers to hydrogen that can form hydrogen bonds.

The reason for presenting a laser device of the invention having an efficient wavelength coverter is explained below.

By using organic ionic crystal as nonlinear optical material, ionic bonds can be introduced in the bonds between molecules. Compared with the conventional molecular crystal, it is possible to obtain a crystal that is easier to grow, higher in hardness and superior in processing. As a result, the fabrication process of a wavelength converter, such as cutting and polishing of crystals, can be executed with high precision. Therefore, a wavelength converter having a favorable surface precision is realized, and lowering of light transmittance due to scattering or the like may be prevented.

By using organic ionic crystals containing metal ions, preferably metal ions with a large degree of dissociation, it is possible to (1) introduce stronger ionic bonds than amine salt, and
(2) increase the crystal density.

The thermal conductivity k of material is $$k = C_p . \alpha . \rho$$

where
$C_p$: specific heat $(J.g^{-1}K^{-1})$
$\alpha$: thermal diffusivity $(m^2.sec^{-1})$
$\rho$: density $(g.m^{-3})$ Therefore, the thermal conductivity is greater when the density is higher, and the crystal is harder; the thermal diffusivity is higher. Hence, in the organic ionic crystal containing metal ions, a wavelength converter having a relatively favorable thermal conductivity can be realized.

Moreover, it is free from disadvantage such as problems of coloring due to deterioration of amine (considered to be due to oxidation), which often is significant in amine salt (for example, T. Sasaki et al., Journal of the Japan Association of Crystal Growth. Vol. 16, 1989, 34). With the organic ionic crystal having aromatic rings, it is possible to employ a large nonlinear optical characteristics by the $\pi$-electrons of the aromatic rings.

By using the organic ionic crystal having at least one ionic bonding hydrogen, hydrogen bonding hydrogen and hydrogen of water of crystallization replaced with deuterium as the wavelength converter, the processing precision of the wavelength converter is enhanced, and it is possible to increase the transmissivity of the fundamental wave of wavelength 1 $\mu$m band (in particular, about 0.7 to 1.1 $\mu$m), so that a laser device having a high efficiency wavelength converter is realized. Incidentally, the hydrogen to be replaced by deuterium in the nonlinear optical material of the invention (the ionic bonding hydrogen, hydrogen bonding hydrogen, hydrogen of water of crystallization of organic ion crystal) refers to so-called easy-to-dissociate active hydrogen, such as hydrogen of a hydroxyl group, hydrogen of a carboxylic group, hydrogen of a sulfonic group, and hydrogen bonded to carbon beside the electron attractive group, such as a nitro group and ketone group.

In the organic ionic crystal, there are hydrogen atoms covalently bonded directly with carbon atoms, aside from ionic bonding hydrogen, hydrogen bonding hydrogen, and hydrogen of water of crystallization. However, the effects of hydrogen covalently bonded directly with carbon atoms on light absorption in the wavelength 1 $\mu$m band, especially in the band of 0.7 to 1.1 $\mu$m which is the oscillation wavelength of the semiconductor laser or Nd:YAG laser pumped a semiconductor laser or Nd:YVO$_4$ laser pumped a semiconductor laser, are far smaller than those of the dissociable active hydrogen.

The dissociable active hydrogen is producing molecular vibration or molecular rotation of a relatively large displacement. Therefore, the infrared light absorption by these molecular vibrations does not appear in the specific infrared wavelength, but appears in a relatively wide wavelength range. The light absorption by molecular vibration of the higher mode of this fundamental mode is likely to appear in a wide wavelength range in a band of 0.7 to 1.1 $\mu$m, and hence the light absorption of the fundamental wave by the dissociable hydrogen is particularly larger than the hydrogen bonded with the carbon atoms by a covalent bond. Furthermore, the hydrogen covalently bonded directly with the carbon atom is not replaced with deuterium only by crystallizing from the solvent containing deuterium, and it is necessary to newly synthesize the nonlinear optical compound from the deuterium material, at a very high cost. Therefore, by replacing the dissociable hydrogen with deuterium, it is possible to reduce light absorption in the band of 0.7 to 1.1 μm efficiently and at low cost.

In the laser device of the invention, according to one embodiment for obtaining a nonlinear optical material composed of organic ionic crystal replaced with deuterium—obtained by removing the water of crystallization of organic ion crystal for composing the nonlinear optical material by letting stand in heat and/or in a vacuum, and recrystallizing with a solvent containing at least one of ionic bonding deuterium, hydrogen bonding deuterium or heavy water—the efficiency of replacement with deuterium is improved; thus, a nonlinear optical material of a high deuterium replacement rate can be easily obtained.

In the laser device of the invention, according to another embodiment for obtaining a nonlinear optical material having the hydrogen of water of crystallization of sodium p-nitrophenolate dihydrate crystal replaced with deuterium, sodium p-nitrophenolate dihydrate has wavelength at absorption edge of 515 nm and a relatively large nonlinear optical constant. And large-sized crystals having excellent optical uniformity can be grown in a short period. By replacing the hydrogen of water of crystallization with deuterium, the light transmittance in the near infrared to infrared region in the wavelength band of 1 μm can be improved. Therefore, this material becomes suitable for the wavelength converter of a lower power Nd:YAG laser light and Nd:YVO$_4$ laser light which are pumped by semiconductor laser light.

In the laser device of the invention, according to another embodiment for obtaining a nonlinear optical material having the hydrogen of water of crystallization of p-nitrophenoxy acetic acid sodium salt monohydrate crystal replaced with deuterium, the organic ionic crystal possesing the hydrogen of crystalline water of p-nitrophenoxy acetic sodium monohydrate crystal replaced with deuterium has an absorption edge wavelength of about 410 nm, a relatively short wavelength. Therefore, it is effective as the crystal for a wavelength converter without absorbing the second harmonic light of the AlGaAs semiconductor laser one in the wavelength band of 840 nm, or the semiconductor laser light using the superlattice structure of InGaAs in the wavelength band of 980 nm. Moreover, by replacing the hydrogen of water of crystallization with deuterium, the light transmittance can be improved in the near infrared to infrared region in the wavelength band of 0.7 to 1.1 μm.

In the laser device of the invention, according to another embodiment for obtaining a nonlinear optical material having hydrogen of water of crystallization of 5-sulfosalicylic acid disodium salt trihydrate crystal and hydrogen of hydroxyl group replaced with deuterium, the organic ionic crystal having hydrogen of water of crystallization of 5-sulfosalicylic acid disodium salt trihydrate crystal and hydrogen of hydroxyl group replaced with deuterium has an absorption edge wavelength of about 370 nm. and it is further effective for second harmonics generation of shorter wavelength. So, in this case, it is possible to use a laser material such as Ti:Al$_2$O$_3$, Cr:LiCaAlF$_6$, Cr:LiSrAlF$_6$ and so on which emit shorter wavelength light than Nd:laser material does.

DESCRIPTION OF THE PREFERRED EMBODIMENTS

Figure 1:
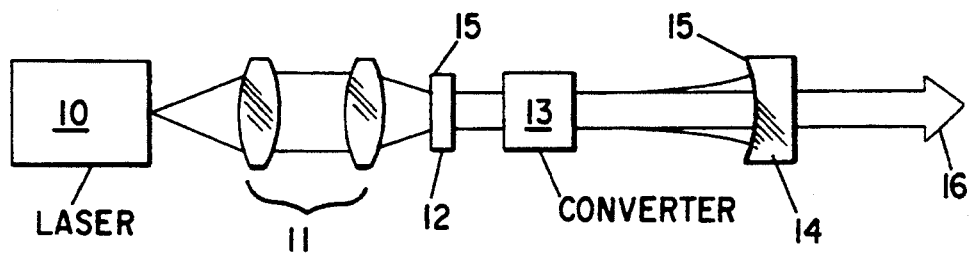
FIG. 1 is a diagram showing the outline of a laser device in an embodiment of the invention.

The invention will now described in detail with reference to the accompanying figures.

In organic ionic crystals, ionic bonding hydrogen, hydrogen bonding hydrogen, or hydrogen of water of crystallization is generally present more than in ordinary molecular crystals. These hydrogens induce strong infrared absorption in the wavelength region of 2 μm or more by molecular vibration or rotation. The higher mode infrared absorption by molecular vibration and rotation coincides with the wavelength of near infrared to infrared light in the 1 μm band to be used in wavelength conversion, and therefore if the ordinary organic ionic crystal is used in the wavelength converter, the transmittance of the fundamental wave light is not sufficient, and therefore a laser device with a highly efficient wavelength converter is not realized. These hydrogens of ionic bonding, hydrogen bonding and water of crystallization are different from hydrogen of a covalent bond, and can be easily replaced with deuterium by repeating recrystallization in the solvent containing hydrogen bonding deuterium such as heavy water (D$_2$O), heavy methanol (CH$_3$OD), heavy ethanol (C$_2$H$_5$OD) and heavy acetone (CD$_3$COCD$_3$), or dissociable deuterium bonded with the adjacent carbon atom of a ketone group or nitro group.

The nonlinear optical material is an organic ionic crystal containing at least one of aromatic ring and metal ion, showing second order nonlinear optical effect, being a material having at least one of ionic bonding hydrogen, hydrogen bonding hydrogen or hydrogen of water of crystallization replaced with deuterium. By using organic ionic crystals containing metal ions, preferably metal ions with a large degree of dissociation (metal with small ionization energy), (1) the ionic bonds of the organic ionic crystals are stronger than that of amine salt, and (2) the crystal density can be increased, so that a wavelength converter possessing a relatively favorable thermal conductivity can be fabricated.

As metal ions with a large degree of dissociation, alkaline metal ions, alkaline earth metal ions, and rare earth metal ions are preferred. To increase the crystal density, moreover, lead ions, bismuth ions, rare earth metal ions and the the like are preferred. Therefore, if the laser light is focused on the wavelength converter, the temperature rise is small, and thus problems such as deviation of phase matched condition and lowering of conversion efficiency rarely occur.

With a nonlinear optical material having at least one of aromatic ring, moreover, it is possible to employ a large nonlinear optical characteristic by the $\pi$-electrons of the aromatic rings. Herein, in order to obtain a proper nonlinear optical constant value and shorter wavelength at the absorption edge than the generated harmonic wavelength, as for the aromatic rings, single rings with short conjugate length are desired such as benzene rings, furan rings and oxazol rings. In addition, it is preferable to have electron donative groups and electron attractive groups of proper strength, but not overly strong.

What are more preferable as nonlinear optical materials include organic ionic crystal having hydrogen of water of crystallization of sodium p-nitrophenolate dihydrate (Formula 1) replaced with deuterium, organic ionic crystal having hydrogen of water of crystallization of p-nitrophenoxy acetic acid sodium salt monohydrate (Formula 2) crystal replaced with deuterium, and organic ionic crystal having hydrogen of water of crystallization of 5-sulfosalicylic acid disodium salt trihydrate (Formula 3) crystal and hydrogen of hydroxyl group replaced with deuterium.

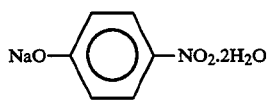
(Formula 1)

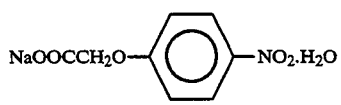
(Formula 2)

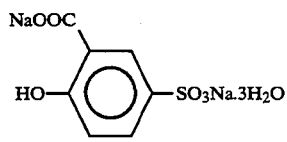
(Formula 3)

To replace the hydrogen of water of crystallization and the hydrogen of hydroxyl group of organic ionic crystal with deuterium, it is enough to recrystallize the organic ionic crystals in, for example, heavy water. To enhance the heavy water replacement rate, these organic ionic crystals are let to stand in heat and/or a vacuum to remove water of crystallization as much as possible, and recrystallized in heavy water several times, so that the heavy water replacement rate is enhanced. The heating temperature varies with the degree of vacuum and kind of organic ionic crystal, and hence cannot be defined generally, but it is preferable to heat over 100° C., for example, although this is not intended to be limitative, and heating is done under the decomposition temperature of the compound. Tim vacuum is not particularly defined, but the higher the degree of vacuum, the more efficiently the water of crystallization is removed. Usually, considering the capacity of the generally available vacuum device, a vacuum of about up to $10^{-6}$ Torr is employed.

For fabrication of the wavelength converter, the crystal of the organic ionic crystal is grown, and is cut in the phase-matching direction. Consequently, polishing and coating are carried out in order to prevent scatter or reflection of light. The organic ionic crystals are relatively hard compared with ordinary molecular crystals, and hence cutting and polishing can be done easily. The coating is not particularly defined, but multilayer coats of dielectric film such as $SiO_2$, $TiO_2$, $MgF_2$ and so on are generally used. Instead of a direct coating process, anti-reflective coated optical glass plates may be used with matching fluid or resin so that fundamental waves and higher harmonics may transmit easily. As matching fluids and resins, these may be selected from ones having the refractive index close to that of the nonlinear optical material of the invention; for example, 1-bromonaphthalene is used as the matching fluid and epoxy resin as the resin.

By using the fabricated device as the wavelength converter in the laser device (internal resonator type) comprising a semiconductor laser, solid-state laser medium, optical resonator and wavelength converter, or in the laser device (external resonator type) comprising a semiconductor laser, optical resonator and wavelength converter, a laser device having a wavelength converter of high efficiency is realized. At this time, it is possible to solve the problem of heat, which matters when using ordinary molecular crystals. This is because crystal hardness is high in the organic ionic crystals, especially organic ionic crystals containing metal ions of a large degree of dissociation (metal with small ionization energy), since the molecules are bonded together through strong ionic bonds, and the crystal density is increased by the metal ions in ionic crystals. These two effects are combined to raise the thermal conductivity higher than that of molecular crystals. By using a wavelength converter of ordinary molecular crystals, the fundamental wave is focused in one part of the crystals, a partial temperature rise occurs at this part, and the phase-matching condition (the propagation condition of fundamental wave and harmonic wave at the same phase velocity in crystals) is broken. As a result, the problem of failure of elevation of conversion efficiency in spite of an increase in strength of fundamental wave can be avoided by using organic ionic crystals containing metal ions, so that the laser device possessing a wavelength converter of high efficiency is realized.

The invention is described in further detail by referring to the following examples.

EXAMPLE 1

As sodium p-nitrophenolate dihydrate, the reagent of Tokyo Kaset Kogyo (distributed as 4-nitrophenol sodium salt dihydrate) was recrystallized and refined in methanol three times, and single crystals were obtained. The product is sample 1. This sample 1 was presented for thermogravimetry. At a temperature increase rate of 10° C./min, measurements were taken from room temperature to 600° C. In a temperature range of about 100° C. to 170° C., 18.5% of the total weight was lost. This value coincides very well with the weight ratio 18.3% of the crystalline water to crystals, and it seems that all crystalline water in the crystals was lost in this temperature range.

After grinding 30.0 g of sample 1 sufficiently in an agate mortar, it was put into a flask and heated in an oil bath at about 200° C. in order to remove water of crystallization. Heating was conducted while stirring the sample. After about 30 minutes the water of crystallization in the sample was lost, the color changed from yellow to red, and a three-way cock was attached to the opening of the flask, and air was exhausted to a degree of vacuum of $10^{-3}$ Torr. In this period, heating in an oil bath at about 200° C. continued, and almost all water of crystallization was removed.

Afterwards, while continuing to exhaust air, the sample was let to stand to cool at room temperature. When the sample was cooled nearly to room temperature, nitrogen gas was charged into the flask to maintain at about one atmospheric pressure. The sample was then kept at around 40° C., and while blowing nitrogen gas into one opening of the three-way cock, heavy water ($D_2O$) was gradually added from the other opening by using a syringe. After adding 270 ml, the sample was completed dissolved, and became an orange-colored solution. In this period, the sample solution was maintained at about 40° C. Then the flask was sealed to shut off air, and the solution was cooled. When cooled sufficiently, yellow crystals precipitated. This recrystallization operation was conducted in order to replace the hydrogen atoms in the water of crystallization in sample 1 with deuterium atoms. The crystals were dried in air to obtain sample 2, of which weight was found to be 28.2 g.

By measurement of the NMR spectrum (nuclear magnetic resonance spectrum), hydrogen of water of crystallization was replaced by deuterium at a rate of 96%.

In the powder of sample 2, the second harmonic generation (SHG) was measured by the powder method according to the Kurtz method mentioned in page 3798 of the Journal of Applied Physics vol. 39, 1968. The sample was ground in an agate mortar, and a Nd:YAG laser (wavelength 1064 nm) was used as the light source. The SHG strength was about 10 times the value of urea, and an excellent nonlinear optical characteristic was observed.

Successively, 11.5 g of sample 2 was dissolved in 60 cc of methanol-d ($CH_3OD$) at 40° C., and a saturated solution was prepared. From this saturated solution, crystals were grown by the temperature decrease method. The growth start temperature was 40° C. and was gradually cooled at a rate of 1 to 2° C. daily. In about 10 days, an optically favorable crystal (sample 3) in a size of 15 mm × 10 mm × 7 mm was obtained. In the growth process, the solution containing the crystal was maintained in a nitrogen atmosphere because it would be affected by water molecules in air.

The Vickers hardness of sample 3 was measured, and a large value of 34 was obtained. This value was, for example, about two times the Vickers hardness 16 of the molecular crystal 2-(N-prolinol)-5-nitropyridine (PNP) possessing a typical nonlinear optical characteristic, and more than three times the Vickers hardness 9 of the urea crystal. The wavelength at the absorption edge of sample 3 was about 515 nm as a result of measurement by the transmission method by using a spectrophotometer.

The crystal growth in this embodiment was by the temperature decrease method, but it is also possible to employ the solvent evaporation method; that is, the method of precipitating and growing crystals by slowly evaporating the solvent of the satulated solution.

The laser device of the invention is described by reference to FIG. 1.

FIG. 1 is a diagram showing the outline of the laser device of the invention, in which numeral 10 is a semiconductor laser, 11 is a lens system for focusing the laser light, 12 is an Nd:YAG crystal, 13 is a wavelength converter, 14 is an output mirror, and 16 is a second harmonic light. In this embodiment, an optical resonator 15 is composed between the semiconductor laser side end face of Nd:YAG crystal 12 and the concave surface of mirror 14. Wavelength converter 13 was prepared by adhering the optical glass with antireflective film so as to facilitate transmission of light in wavelength of both 1064 nm and 532 nm to the crystal. As for adhesive materials, matching solution (in this case, 1-bromonaphthalene) or resin (for example, epoxy resin) was used. The crystal cut out from sample 3 in the phase-matching direction (thickness 1 to 5 mm) having the hydrogen of water of crystallization of sodium p-nitrophenolate dihydrate of the invention replaced with deuterium.

The surface of mirror 14 is coated with a dielectric multilayer film so as to reflect the fundamental wave of wavelength 1064 nm, and transmit the light of the wavelength converted to 532 nm. On the end face (the side facing of lens system 11) of Nd:YAG crystal 12 is formed a dielectric multilayer film which transmits the pump light (808 nm) from semiconductor laser 10, and reflects the light of wavelength 1064 nm and wavelength 532 nm of second harmonics. Using the semiconductor laser (wavelength 808 nm, output 1 W), Nd:YAG crystal 11 is pumped, and laser light of wavelength 1064 nm is oscillated. At this time, a strong fundamental wave is excited in the optical resonator, so that wavelength conversion may be accomplished efficiently. That is, the laser light of wavelength 1064 nm is partly converted in wavelength as it passes through wavelength converter 13, thereby generating second harmonics of 532 nm. These laser lights reach mirror 14, and light of wavelength 1064 nm not converted in wavelength is reflected on the surface of mirror 14 to pass through wavelength converter 13, and is reflected on the end face of Nd:YAG crystal 12 to pass through wavelength converter 13 again, and the second harmonic wave of the wavelength converted to 532 nm passes through mirror 14 and is output as the second harmonic wave 16. The laser light of wavelength 1064 nm not yet converted in wavelength is reflected by mirror 14 again, and this process is repeated, and after passing through wavelength converter 13 several times, the second harmonic wave of the wavelength converted to 532 nm is output as second harmonic wave 16.

Figure 2:
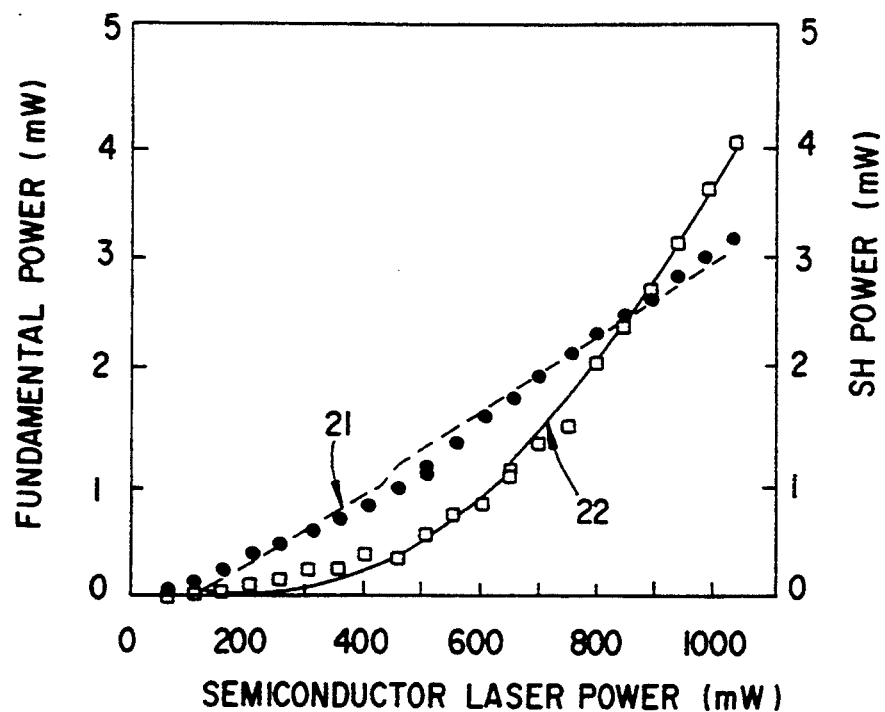
FIG. 2 is a graph showing the output characteristic of the laser device in Example 1 of the invention.

The output characteristic of the laser device of the invention is shown in FIG. 2.

FIG. 2 shows the result of using the device (crystal thickness 2.2 mm) of the crystal having the hydrogen of water of crystallization of sodium p-nitrophenolate dihydrate replaced with deuterium. The horizontal axis denotes the semiconductor laser power for pumping, and the vertical axis of ordinates represents the fundamental wave power leaking out from output mirror 14 and the wavelength converted SH light (secondary harmonic) power. In FIG. 2, numeral 21 denotes a fundamental wave and 22 is a characteristic curve of a SH wave. The fundamental wave power is proportional to the semiconductor laser power for pumping, and the SH light power is nearly proportional to the square of the semiconductor laser power. At the semiconductor laser power of 1 W, a green color SH light with a large strength of 4 mW was obtained.

In this embodiment, optical glass plates with antireflection coating films were adhered to the crystal surfaces by 1-bromonaphthalene, but any other material capable of applying a antireflection films directly on the organic crystal can be used.

Comparative Example 1

Figure 3:
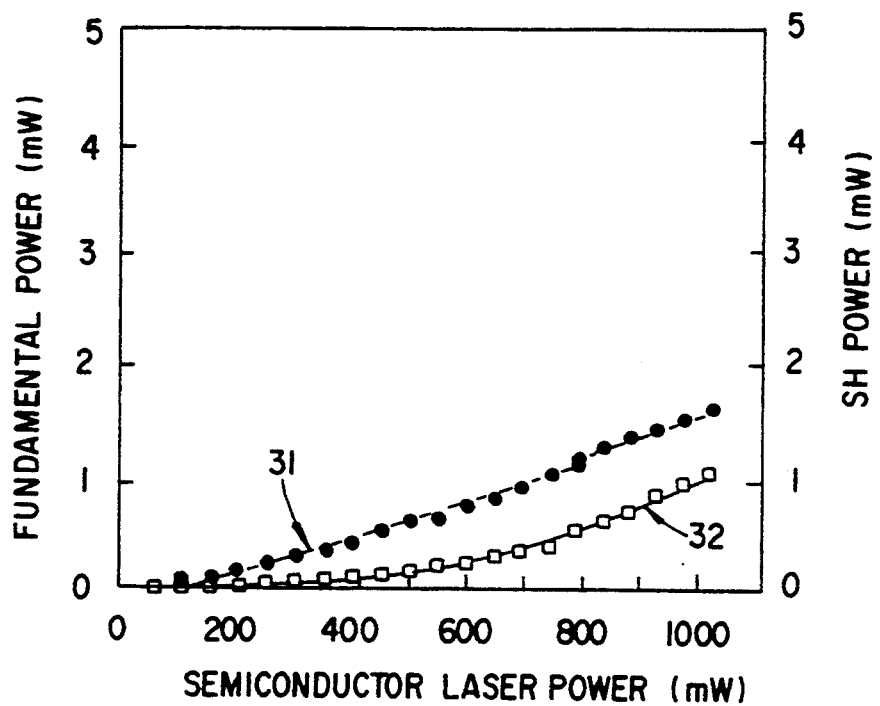
FIG. 3 is a graph showing the output characteristic of the Laser device in Comparison 1 of the invention.

FIG. 3 shows the output characteristic of the laser device using the sodium p-nitrophenolate dihydrate crystal containing ordinary water of crystalline ($H_2O$) grown by using sample 1 as for generation of second harmonics. In FIG. 3, numeral 31 denotes a fundamental wave, and 32 is a characteristic curve of a SH wave.

At the pumping semiconductor laser power of 1 W, only SH light power of 1 mW was obtained. Comparing the fundamental wave power leaking out from mirror 14, 1.6 mW resulted when using the device ($H_2O$) fabricated from the sample containing ordinary water of crystallization, which was about half of the 3.2 mW of the fundamental wave power when using the sample fabricated from the crystal containing heavy water ($D_2O$) as water of crystallization.

This suggests that the fundamental wave power in the optical resonator of the sodium p-nitrophenolate dihydrate containing heavy water was twice as high as that of the sodium p-nitrophenolate dihydrate using ordinary water as water of crystallization, since the transmittance of the fundamental wave is high.

Figure 4:
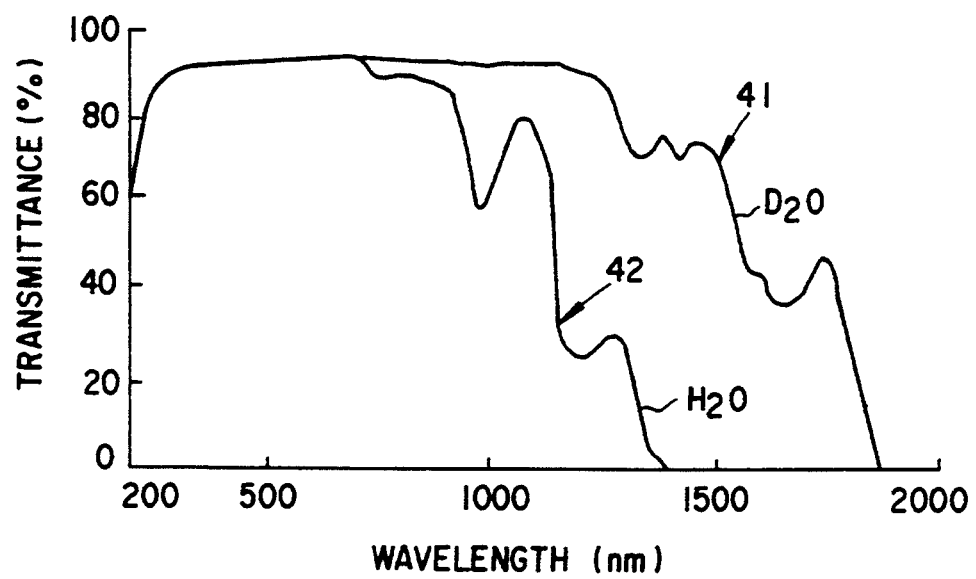
FIG. 4 is a graph showing the optical transmittance spectra of H$_2$O and D$_2$O.

FIG. 4 shows light transmission spectra (quartz cell: sample thickness 10 mm) of $H_2O$ (42) and $D_2O$ (41). In the near infrared to infrared region of the wavelength 1 $\mu m$ band (over 700 nm). $D_2O$ has a higher transmittance than $H_2O$, and by replacing the hydrogen of water of crystallization with deuterium, the light transmissivity of the fundamental wave is enhanced, and thus a wavelength converter of high efficiency is realized.

Comparative Example 2

Figure 5:
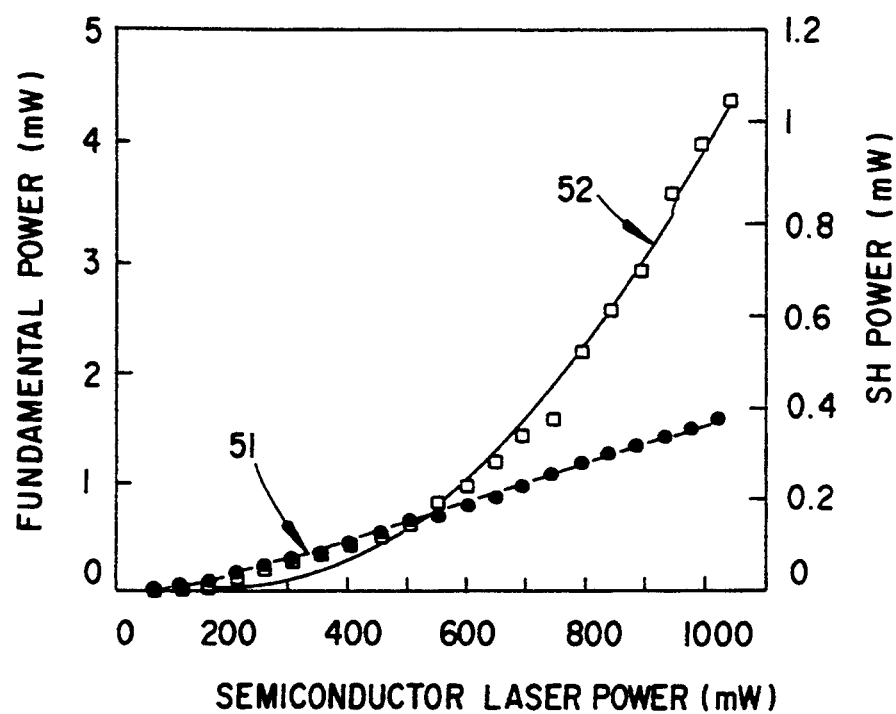
FIG. 5 is a graph showing the output characteristic of the laser device in Comparison 2 of the invention.
Figure 6:
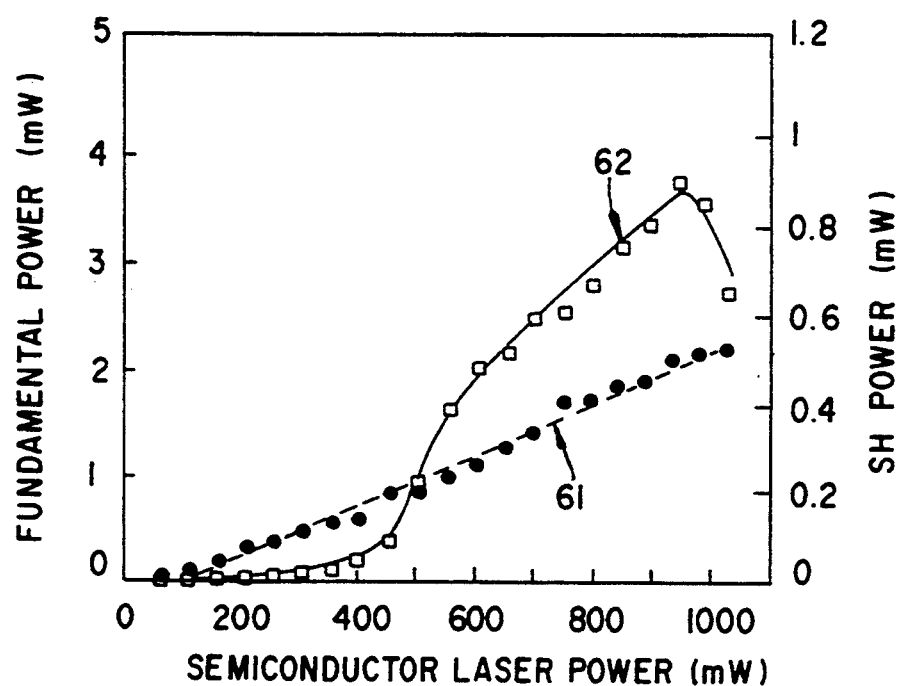
FIG. 6 is a graph showing the output characteristic of the laser device in Comparison 2 of the invention.

The output characteristics are compared in FIG. 5 and FIG. 6 between the laser device having the wavelength converter using sodium p-nitrophenolate dihydrate containing ordinary water of crystallization and the laser device having the wavelength converter using 3-methyl-4-nitropyridine-1-oxide (POM).

FIG. 6 shows the output characteristic of the laser device having a wavelength converter using POM crystal, which is a molecular crystal. Numeral 61 denotes a fundamental wave and 62 is a characteristic curve of a SH wave.

The fundamental power is proportional to the pumping semiconductor laser power, but SH light power is not proportional to the square of the pumping semiconductor laser power (or fundamental power) and shows a complicated characteristic. This may be considered as follows. While the pumping semiconductor laser power is small (semiconductor laser power of 50 mW to about 500 mW), the crystal angle does not coincide with the phase-matching angle completely, and a large SH light power is not obtained. When the pumping semiconductor laser power is at medium strength (500 mW to about 800 mW), the temperature of the crystal in which the fundamental wave is focused on the wave length converter increases, and the phase-matching condition is about to be satisfied, so that a relatively large SH light intensity is obtained. Also at this time, since a molecular crystal with poor thermal conductivity is used, the crystal has a temperature gradient, and the magnitude of the temperature gradient varies with the pumping semiconductor laser power, so that SH light power is not proportional to the square of the pumping semiconductor laser power (or fundamental power). When the pumping semiconductor laser power is high (900 mW to about 1000 mW), the crystal temperature increases so as to be out of the phase-matching condition, so that SH light power decreases although the fundamental wave power increases. Furthermore, when the pumping semiconductor laser power is 1000 mW, deterioration of the beam pattern of SH light is observed, which suggests that the phase-matching condition is partly broken in the crystal. Incidentally, the output characteristic of the laser device was not every time; it has been shown that different output characteristics are influenced by room temperature and the samples used. However, every sample of SH light power is not proportional to the square of the pumping semiconductor laser power (or fundamental power).

FIG. 5 shows the output characteristic of the laser device having a wavelength converter using sodium p-nitrophenolate dihydrate containing ordinary water of crystallization (the diagram plotted by changing the scale of FIG. 3). Numeral 51 denotes a fundamental wave, and 52 is a characteristic curve of a SH wave.

The fundamental power is proportional to the pumping semiconductor laser power, and SH light power is proportional to the square of the pumping semiconductor laser power; this is because an organic ionic crystal with superior thermal conductivity is used as the wavelength converter, and the heat generated in the crystal travels quickly to the crystal surface to be cooled, and the temperature rise of the crystal is small, so that the phase-matching condition is not broken.

Table 1 shows an example of measurement of thermal conductivity of various nonlinear optical materials and optical materials by the laser flash method. The thermal conductivity of hitherto well-known molecular crystals (m-nitroaniline, urea, methyl-(2,4-dinitrophenyl)-amino propanate (MAP), 3-methyl-4-nitropyridine-1-oxide (POM)) ranges from 0.21 to 0.35 $W \cdot m^{-1} \cdot K^{-1}$. The thermal conductivity of organic ionic crystal L-arginine phosphate monohydrate (LAP) is 0.59 $W \cdot m^{-1} \cdot K^{-1}$, and that of organic ionic crystals containing metal ions (p-nitrophenoxy acetic acid sodium salt monohydrate crystal, sodium p-nitrophenolate dihydrate crystal, sulfosalicylic acid disodium salt trihydrate crystal) is 0.6 to 0.85 $W \cdot m^{-1} \cdot K^{-1}$, showing a thermal conductivity two or three times greater than that of ordinary molecular crystals. It is also known that the organic ionic crystals containing metal ions show greater thermal conductivity than the amine salt crystal (LAP). These values of thermal conductivity are similar to those of optical glass used in the ordinary optical device. This result sufficiently explains why the heat effect was not observed when the wavelength converter made of organic ionic crystals containing metal ions was placed in the optical resonator. The thermal conductivity of the organic ionic crystal replaced with deuterium was nearly the same as the thermal conductivity of the ordinary ionic crystal not replaced with deuterium.

TABLE 1

| Material | Thermal conductivity ($W \cdot m^{-1} \cdot K^{-1}$) |
| --- | --- |
| Optical glass | 0.67–1.38 |
| m-Nitroaniline (m-NA) | 0.21 |
| Urea | 0.23 |
| Methyl-(2,4-dinitrophenyl)-aminopropanate (MAP) | 0.29 |
| 3-Methyl-4-nitropyridine-1-oxide (POM) | 0.35 |
| L-Arginine phosphate monohydrate (LAP) | 0.59 |
| p-Nitrophenoxy acetic acid sodium salt monohydrate | 0.60 |
| Sodium p-nitrophenolate dihydrate | 0.63 |

TABLE 1-continued

| Material | Thermal conductivity (W . m$^{-1}$ . K$^{-1}$) |
|---|---|
| 5-Sulfosalicylic acid disodium salt trihydrate | 0.85 |

EXAMPLE 2

By mixing a solution of 0.986 g of p-nitrophenoxy acetic acid manufactured by Tokyo Kasei Kogyo dissolved in 55 ml of ethanol and a solution of 0.203 g of sodium hydroxide dissolved in 10 ml of ethanol, a pale yellow sediment was obtained. This sediment was removed and dried in air, and sample 4 was obtained.

In the $^1$H-NMR spectrum (peak of tetramethyl silane as 0 ppm) of CD$_3$OD solution of sample 4, a signal due to the methylene group (2 protons) was noted at 4.5 ppm, a signal due to the crystalline water molecule (2 protons) at 4.8 ppm, a signal due to o-position hydrogen (2 protons) bonded with a benzene ring at 7.0 ppm, and a signal due to m-position hydrogen (2 protons) bonded with benzene ring at 8.1 ppm, at the integrated strength ratio of 1:1:1:1, and hence sample 4 is considered to contain p-nitrophenoxy acetic acid or its salt and water at a molar ratio of 1:1.

Figure 7:
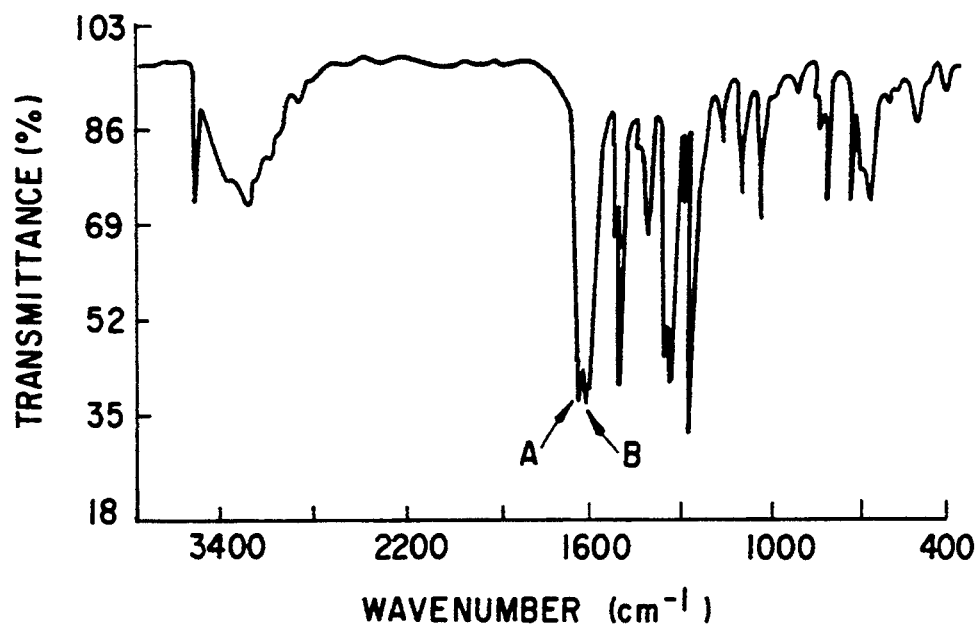
FIG 7 is a graph showing an infrared absorption spectrum of p-nitrophenoxy acetic acid sodium salt monohydrate.
Figure 8:
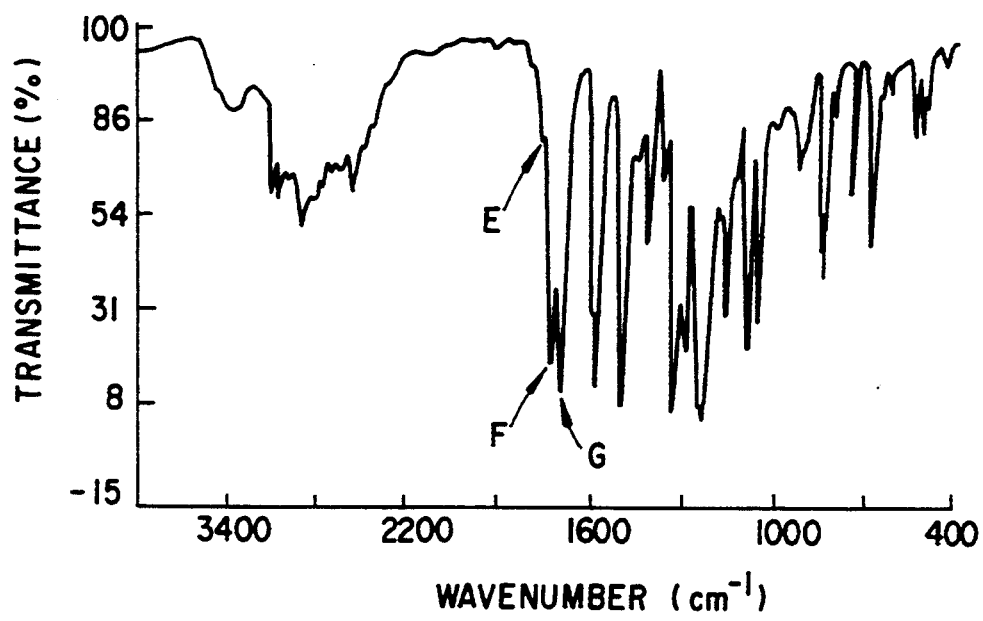
FIG. 8 is a graph showing an infrared absorption spectrum of p-nitrophenoxy acetic acid.

Infrared absorption spectra of sample 4 and p-nitrophenoxy acetic acid of Tokyo Kasei Kogyo by a transmission method (KBr tablet method) are shown in FIG. 7 and FIG. 8, respectively.

The absorption due to a carboxy group observed in the spectrum in FIG. 8 (1780, 1738, 1708 cm$^{-1}$; respectively indicated by E, F, G in FIG. 8) was not found in the spectrum in FIG. 7. Furthermore, the absorption due to a carboxylate group not shown in FIG. 8 (1635, 1609 cm$^{-1}$; respectively indicated by A, B) is noted in the spectrum in FIG. 7. Considered together with the results of the NMR mentioned above, the sample 4 is considered to contain p-nitrophenoxy acetate and water at a molar ratio of 1:1. In this case, as a positive ion of salt, nothing but sodium ions can be considered.

Moreover, in the DSC (differential scanning calorimetry) chart of sample 4, exothermic peak due to freezing of water was not observed when the sample was cooled from room temperature to $-50°$ C. When the sample was heated from $-50°$ C. to room temperature, endothermic peak due to melting of ice was noted. Hence, the water contained in sample 4 was found to be water of crystallization, not free water.

As a result, sample 4 is a p-nitrophenoxy acetic acid sodium salt monohydrate.

In sample 4, the second harmonic generation (SHG) was measured by the powder method. The sample was pulverized in an agate mortar, and the light source was a Nd:YAG laser (wavelength 1064 nm). The intensity of SHG was about 10 times that of urea, and an excellent nonlinear optical characteristic was observed.

The powder of sample 4 was dissolved in water at 40° C., and a saturated solution was prepared. From this saturated solution, crystals were grown by the temperature decrease method. The growth start temperature was 40° C., and was gradually cooled at a rate of 2° C. per day. In about ten days, a large—for example, 8 mm×5 mm×4 mm—crystal was obtained. This crystal was used as sample 5. The wavelength at the absorption edge of the crystal was about 410 nm as a result of measurement by the transmission method by using a spectrophotometer.

Instead of the temperature decrease method for crystal growth in the embodiment, the solvent evaporation method may be similarly employed.

Explained next is the transformation from water of crystallization of p-nitrophenoxy acetic acid sodium salt to heavy water.

In the following operation, the procedure for putting the inside of the flask in an air exhaust state and in a nitrogen atmosphere state was conducted in order to avoid effects of moisture in air, for example, an exchange reaction of H and D of heavy water.

A sample synthesized the same way as sample 4 of 30.0 g was ground finely in an agate mortar and put in flask, and a three-way cock was attached to the flask. The flask was evacuated, and nitrogen gas at room temperature was charged in to maintain about one atmospheric pressure. Then the sample was maintained at about 50° C., and nitrogen gas at room temperature was blown in from one opening of the three-way cock, while heavy water was gradually applied from the other opening by using a syringe. When about 60 ml was added, the sample was completely dissolved, and a pale yellow solution was obtained. In this period, the sample solution was kept at around 50° C. The flask was then sealed to shut out air, and the solution was cooled gradually, and pale yellow crystals precipitated. The precipitating crystals were dried in a dry nitrogen atmosphere. This heavy water conversion operation was conducted three times, and the heavy water sample was obtained. This recrystallization operation was intended to replace the hydrogen of water of crystallization of sample 4 with deuterium. The obtained powder sample was measured for SHG by the powder method. As a result, the SHG intensity was about 10 times that of urea of the same level as sample 4 not replaced with heavy water.

The powder of this sample was dissolved in heavy water at 40° C., and a saturated solution was obtained. The crystal growth temperature was 40° C., and was gradually cooled at a rate of 0.2° to 2° C. daily. In about 10 days, a large crystal of 10 mm×4 mm×4 mm was obtained. This crystal was used as sample 6. The heavy water ratio of the crystalline water of the obtained sample was 91% as measured by the NMR method. The wavelength at the absorption edge of this crystal was about 410 nm as measured by the transmission method using a spectrophotometer.

As in Example 1, by recrystallizing in heavy water after removing crystalline water by evacuating and heating, the heavy water ratio of the water of crystallization can be enhanced by a few repetitions of recrystallization.

From sample 5 (p-nitrophenoxy acetic acid sodium salt monohydrate) and sample 6 (crystal by replacing the water of crystallization of p-nitrophenoxy acetic acid sodium monohydrate with heavy water), crystals were cut in the phase-matching direction at a wavelength of 1064 nm. As in Example 1, the crystals were polished, and optical glass plates with antireflection film were adhered to both end surface of the crystal by using matching oil, and a wavelength converter was fabricated. The wavelength converters were arranged in the optical resonator in the same device as in Example 1 to obtain the laser device. When using the wavelength converter obtained from sample 6, at the semiconductor laser power of 1 W, a large second harmonic output of 4 mW was obtained.

When using the wavelength converter fabricated from sample 5, at the semiconductor laser power of 1 W, a second harmonic output of only 0.4 mW was obtained.

EXAMPLE 3

In the same operation as in Example 2, sample 5 (p-nitrophenoxy acetic acid sodium salt monohydrate) and sample 6 (Crystal by replacing the water of crystallization of p-nitrophenoxy acetic acid sodium salt monohydrate with heavy water) were prepared. These samples were then confirmed to be matched in phase at a wavelength of 980 nm by using a pulsed dye laser. Sample 5 and sample 6 were cut in the phase-matched direction at wavelength 980 nm. Then, as in Example 1 and Example 2, the wavelength converters were fabricated.

Figure 9:
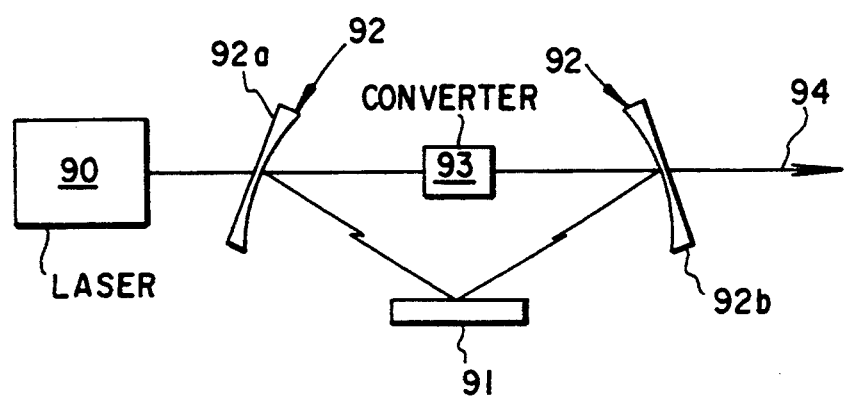
FIG. 9 is a diagram showing the outline of a laser device in another embodiment of the invention.

Referring now to FIG. 9, the laser device comprising a wavelength converter of an external resonator type of the invention is explained below. As the fundamental wave light source, the semiconductor laser 90 using a InGaAs superlattice structure of wavelength 980 nm was used. The optical resonator is a ring resonator composed of two concave mirrors 92 (92a, 92b) and one flat mirror 91. The input side mirror 92a and the plane mirror 91 are coated with a dielectric multilayer film for reflecting light of wavelength 980 nm and 490 nm. The output side mirror 92b is coated with a dielectric multilayer film for reflecting light of wavelength 980 nm and transmitting light of 490 nm. The surface of the wavelength converter 93 is laminated with two optical glass plates with antireflection coating so as to efficiently transmit light of wavelength 980 nm as the fundamental wave and light of wavelength 490 nm as the second harmonic wave by using of matching fluid or the UV-resin. When the wavelength of semiconductor laser 90 as the light source matches the resonant wavelength of the ring resonator composed of two concave mirrors 92 and one flat mirror 91, the light leaving semiconductor laser 90 resonates in the optical resonator, and therefore the light intensity of the fundamental wave (wavelength 980 nm) in the resonator is increased and is efficiently converted into the second harmonic wave 94 (wavelength 490 nm). That is, the light converted into the second harmonic wave (wavelength 490 nm) after passing through the wavelength converter 93 passes through the output side concave mirror 92b and is output as second harmonic wave 94, while the light of the fundamental wave (wavelength 980 nm) not converted to second harmonic wave 94 (wavelength 490 nm) is reflected by output side concave mirror 92b, and is also reflected by the plane mirror 91. The light converted into the second harmonic wave (wavelength 490 nm) passes through the output side concave mirror 92b, and is output as second harmonic wave 94, while the light of the fundamental wave (wavelength 980 nm) not converted into the second harmonic wave (wavelength 490 nm) is reflected again by output side concave mirror 92b. The same operation is repeated thereafter, so that the second harmonic waves may be efficiently generated.

Using the laser device of this constitution, an output of second harmonic waves of 2 mW was obtained at the fundamental wave power of 100 mW.

The second harmonic power is proportional to the square of the fundamental wave power, and deterioration of the beam pattern of SH light was not observed.

When using the wavelength converter made from the sample not replaced with deuterium, at the fundamental wave power of 100 mW, an output of only 0.5 mW was obtained as the second harmonic wave.

In addition, for stabilizing the wavelength of the semiconductor laser light, the reflection return light from the concave mirror 92a can be fed back to semiconductor laser 90, and the output of the fundamental wave leaking out of the output mirror 92b can be monitored and the current of the semiconductor laser can be controlled, so that a stable second harmonic output may be obtained.

As the fundamental wave light source, semiconductor laser light of 980 nm was used, but a semiconductor laser light source of another wavelength may be also used, for example, an ordinary AlGaAs semiconductor laser.

EXAMPLE 4

Explained below is a laser device in which the wavelength converter is composed of crystals having the hydrogen of water of crystallization of 5-sulfosalicylic acid disodium salt trihydrate crystal and the hydrogen of an ion-bonding (or hydrogen bonding) hydroxy group replaced with deuterium.

0.969 g of 5-sulfosalicylic acid dihydrate of Tokyo Kasei Kogyo was dissolved in 10 ml of purified water. 0.305 g of sodium hydroxide was dissolved in 5 ml of purified water. These two solutions were mixed, and 5 ml more of purified water was added, and the solution was heated to 60° C. and reacted for 2 hours while stirring. This solution was let to stand for one day at about 10° C., and 0.523 g of colorless powder crystal of 5-sulfosalicylic acid disodium salt trihydrate crystal was obtained (sample 7). This powder crystal was pulverized in agate mortar, and the SHG strength was measured by the powder method, and a similar SHG strength to urea was exhibited.

The materials having the hydrogen of water of crystallization of 5-sulfosalicylic acid disodium salt trihydrate crystal and the hydrogen of hydroxy group of ionic bonding (or hydrogen bonding) hydrogen replaced with deuterium are explained below.

0.969 g of 5-sulfosalicylic acid dihydrate of Tokyo Kasei Kogyo was dissolved in 10 ml of purified water. 0.305 g of sodium hydroxide was dissolved in 5 ml of heavy water. These two solutions were mixed, and 5 ml more of heavy water was added, and the solution was heated to 60° C. and reacted for 2 hours while stirring. This solution was let to stand for one day at about 10° C., and 0.483 g of colorless powder crystal of 5-sulfosalicylic acid disodium salt trihydrate crystal was obtained.

This sample was recrystallized three times in heavy water to obtain the crystal by replacing the crystalline water with deuterium (sample 8) of 5-sulfosalicylic acid disodium trihydrate crystal. The powder crystal of sample 8 was finely pulverized in agate mortar, and the SHG strength was measured by the powder method, and a similar SHG strength to urea was exhibited. Besides, by $^1$HNMR, the replacement rates of water of crystallization and hydrogen of hydroxy group of 5-sulfosalicylic acid into deuterium were both about 92%. This deuterium replacing process was conducted in a globe box filled with dry nitrogen, but the method of Example 1 and Example 2 may be similarly applied.

30.0 g of the sample synthesized in the same method as sample 8 was finely ground in agate mortar, and this powder was dissolved in heavy water at 40° C. to prepare a saturated solution. The crystal growth temperature was 40° C., and was gradually cooled at a rate of 0.2° to 2° C. daily. After about 20 days, a very large colorless transparent crystal of 20 mm×13 mm×33 mm was obtained.

From this crystal, a crystal was cut in the phase matching direction at wavelength 1064 nm, and the wavelength converter was fabricated in the same manner as in Example 1 and Example 2. This wavelength converter was used in the same internal resonator-type laser device as in FIG. 1.

In this embodiment, the constitution is the same as in Example 1 except that the pumping semiconductor laser was of wavelength 808 nm with a pumping power of 3 W. At the pumping semiconductor laser power of 3 W, SH light power of 2 mW was obtained. At this time, the SH light was proportional to the square of the pumping semiconductor laser power and fundamental wave power. There was no deterioration of beam pattern due to the effect of heat.

Using 30.0 g of the sample synthesized in the same manner as in sample 7, a crystal (25 mm×15 mm×40 mm) of 5-sulfosalicylic acid disodium salt trihydrate was grown in 20 days. From this crystal, a crystal was cut in the phase matching in phase at wavelength 1064 nm, and a wavelength converter was fabricated. At the pumping semiconductor laser power of 3 W, an SH light intensity of only 0.3 mW was obtained. Also at this time, the SH light was proportional to the pumping semiconductor laser power and fundamental wave power. There was no deterioration of beam pattern due to the effect of heat.

In the foregoing embodiments, examples of second harmonic generation were explained, but the invention may be also applied to the cases of light sum frequency generation and light difference frequency generation. Instead of the Nd:YAG used as the solid-state laser medium herein, other laser materials may be also used, such as Nd:YVO$_4$, Ti:Al$_2$O$_3$, Nd:LiYF$_4$, LiNdP$_4$O$_{12}$, Cr:LiCaAlF$_6$, Cr:LiSrAlF$_6$.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A laser device, comprising a semiconductor laser, an optical resonator and a wavelength converter, comprising a nonliner optical material, said nonlinear optical material having at least one of an aromatic ring and a metal ion, and having ionic bonds between organic molecules, wherein said metal ion is selected from the group consisting of an alkaline metal ion, an alkaline earth metal ion, a lead ion, a bismuth ion and a rare earth metal ion, and wherein at least one element selected from the group consisting of ion bonding hydrogen, hydrogen bonding hydrogen and hydrogen of water of crystallization is replaced with deuterium.

2. The laser device as claimed in claim 1, wherein said nonlinear optical material is formed by removing water of crystallization from an organic ionic crystal containing at least one of aromatic ring and metal ion, and recrystallizing with a solvent comprising at least one of ionic bonding deuterium, hydrogen bonding deuterium, and heavy water.

3. The laser device as claimed in claim 2, wherein the water of crystallization is removed by heating the organic ionic crystal.

4. The laser device as claimed in claim 2, wherein the water of crystallization of the organic ionic crystal is removed under vacuum.

5. The laser device as claimed in claim 1, wherein said nonlinear optical material comprises sodium p-nitrophenolate dihydrate crystal with the hydrogen of water of crystallization replaced with deuterium.

6. The laser device as claimed in claim 2, wherein said nonlinear optical material comprises sodium p-nitrophenolate dihydrate crystal with the hydrogen of the water of crystallization replaced with deuterium and said crystal is grown from a solution of CH$_3$OD or CD$_3$OD.

7. The laser device as claimed in claim 1, wherein said nonlinear optical material comprises p-nitrophenoxy acetic acid sodium salt monohydrate crystal with the hydrogen of water of crystallization replaced with deuterium.

8. The laser device as claimed in claim 2, wherein said nonlinear optical material comprises p-nitrophenoxy acetic acid sodium salt monohydrate crystal with the hydrogen of water of crystallization replaced with deuterium.

9. The laser device as claimed in claim 1, wherein said nonlinear optical material comprises 5-sulfosalicylic acid disodium salt trihydrate crystal with the hydrogen of water of crystallization and hydrogen of a hydroxyl group replaced with deuterium.

10. The laser device as claimed in claim 2, wherein said nonlinear optical material comprises 5-sulfosalicylic acid disodium salt trihydrate crystal with the hydrogen of water of crystallization and hydrogen of a hydroxyl group replaced with deuterium.

11. The laser device as claimed in claim 1, wherein said aromatic ring is selected from the group consisting of a benzene ring, a furan ring, and an oxazol ring.

12. The laser device as claimed in claim 2, wherein said wavelength converter which, is made of the organic ionic crystal, is cut in a phase-matching direction.

13. The laser device as claimed in claim 1, wherein said wavelength converter is coated with multi-layers of dielectric film.

14. The laser device as claimed in claim 13, wherein said dielectric film is selected from the group consisting of SiO$_2$, TiO$_2$ and MgF$_2$.

15. The laser device as claimed in claim 1, wherein said wavelength coverter is laminated with optical glass plates with antireflective films.

16. A method of a forming a nonlinear optical material for use in a wavelength converter of a laser device, comprising the steps of removing water of crystallization from an organic ionic crystal containing at least one of aromatic ring and metal ion, and recrystallizing with a solvent comprising at least one of ionic bonding deuterium, hydrogen bonding deuterium, and heavy water.

* * * * *